(12) United States Patent
Liu et al.

(10) Patent No.: US 9,843,390 B2
(45) Date of Patent: Dec. 12, 2017

(54) OPTICAL TRANSMITTER WITH OPTICAL RECEIVER-SPECIFIC DISPERSION PRE-COMPENSATION

(71) Applicant: Futurewei Technologies, Inc., Plano, TX (US)

(72) Inventors: Xiang Liu, Marlboro, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/424,587

(22) Filed: Feb. 3, 2017

(65) Prior Publication Data

US 2017/0149503 A1 May 25, 2017

Related U.S. Application Data

(62) Division of application No. 14/503,550, filed on Oct. 1, 2014, now Pat. No. 9,590,730.

(51) Int. Cl.
*H04B 10/50* (2013.01)
*H04B 10/27* (2013.01)
(Continued)

(52) U.S. Cl.
CPC ... *H04B 10/2513* (2013.01); *H04B 10/25752* (2013.01)

(58) Field of Classification Search
CPC .......... H04B 10/2507; H04B 10/25137; H04B 10/2575; H04B 10/2513; H04B 10/25752
(Continued)

(56) References Cited

U.S. PATENT DOCUMENTS 5,101,450 A * 3/1992 Olshansky .......... H04J 14/0298
398/188
5,880,870 A * 3/1999 Sieben ................. G02B 6/2861
398/183
(Continued)

FOREIGN PATENT DOCUMENTS

CN 101577589 A 11/2009
CN 102084611 A 6/2011
(Continued)

OTHER PUBLICATIONS

Partial English Translation and Abstract of Chinese Patent Application No. CN101577589, Aug. 18, 2015, 9 pages.
(Continued)

*Primary Examiner* — Ken N Vanderpuye
*Assistant Examiner* — Dibson Sanchez
(74) *Attorney, Agent, or Firm* — Conley Rose, P.C.

(57) ABSTRACT

An apparatus comprising a digital signal processor (DSP) unit configured to perform fiber dispersion pre-compensation on a digital signal sequence based on a dispersion value to produce a pre-compensated signal, wherein the dispersion value is associated with a remote optical receiver, a plurality of digital-to-analog converters (DACs) coupled to the DSP unit and configured to convert the pre-compensated signal into analog electrical signals, and a frontend coupled to the DACs and configured to convert the analog electrical signals into a first optical signal, adding a constant optical electric (E)-field to the first optical signal to produce a second optical signal, and transmit the second optical signal to the remote optical receiver.

20 Claims, 9 Drawing Sheets

(51) Int. Cl.
*H04J 14/00* (2006.01)
*H04B 10/2513* (2013.01)
*H04B 10/2575* (2013.01)

(58) Field of Classification Search
USPC .................. 398/58–64, 66–73, 182–201
See application file for complete search history.

(56) References Cited

U.S. PATENT DOCUMENTS

| | | | |
|---|---|---|---|
| 6,157,752 A * | 12/2000 | Wood | H04B 10/505 398/1 |
| 6,204,951 B1 * | 3/2001 | Coward | G02F 1/225 398/9 |
| 6,553,081 B1 | 4/2003 | Goodson | |
| 6,798,557 B1 * | 9/2004 | Leven | H04B 10/505 359/279 |
| 7,058,311 B1 | 6/2006 | Islam et al. | |
| 7,266,306 B1 * | 9/2007 | Harley | H04B 10/505 398/182 |
| 7,382,985 B2 | 6/2008 | Roberts et al. | |
| 7,599,625 B1 | 10/2009 | Harley et al. | |
| 7,693,429 B1 * | 4/2010 | Lowery | H04B 10/548 398/182 |
| 8,270,843 B2 | 9/2012 | Nakamoto | |
| 8,331,800 B2 * | 12/2012 | Essiambre | H04B 10/25137 398/159 |
| 8,909,061 B1 | 12/2014 | Varadarajan | |
| 2002/0167693 A1 | 11/2002 | Vrazel et al. | |
| 2003/0102938 A1 * | 6/2003 | Erlig | G02F 1/2255 333/156 |
| 2003/0174386 A1 | 9/2003 | Oikawa et al. | |
| 2004/0197103 A1 | 10/2004 | Roberts et al. | |
| 2006/0127104 A1 * | 6/2006 | Harley | H04B 10/5053 398/198 |
| 2007/0140703 A1 * | 6/2007 | Fells | H04B 10/58 398/159 |
| 2007/0222654 A1 | 9/2007 | Vrazel et al. | |
| 2009/0092350 A1 | 4/2009 | Gill | |
| 2009/0148171 A1 | 6/2009 | Chen et al. | |
| 2009/0175629 A1 | 7/2009 | Liu et al. | |
| 2009/0220110 A1 * | 9/2009 | Bazarjani | H03F 1/0211 381/120 |
| 2009/0238580 A1 * | 9/2009 | Kikuchi | H04B 10/25137 398/192 |
| 2010/0209115 A1 * | 8/2010 | Elahmadi | H04B 10/25137 398/147 |
| 2010/0247100 A1 | 9/2010 | Lin et al. | |
| 2010/0284695 A1 | 11/2010 | Lin | |
| 2011/0158577 A1 | 6/2011 | Doerr | |
| 2012/0099865 A1 | 4/2012 | Ishii et al. | |
| 2012/0301157 A1 | 11/2012 | Qian et al. | |
| 2013/0071119 A1 | 3/2013 | Liu et al. | |
| 2015/0043917 A1 | 2/2015 | Simonneau et al. | |
| 2015/0104181 A1 | 4/2015 | Mazurczyk et al. | |

FOREIGN PATENT DOCUMENTS

| | | |
|---|---|---|
| CN | 102265532 A | 11/2011 |
| WO | 2010071917 A1 | 7/2010 |

OTHER PUBLICATIONS

Lee, S., et al., "Demonstration of a Photonically Controlled RF Phase Shifter," IEEE Microwave and Guided Wave Letters, vol. 9, No. 9, Sep. 1999, pp. 357-359.

Qian, D., et al., "A 105km Reach Fully Passive 10G-PON using a Novel Digital OLT," ECOC Technical Digest, Sep. 2012, 3 pages.

Vacondio, F., et al., "Flexible TDMA access optical networks enabled by burst-mode software defined coherent transponders," 39th European Conference and Exhibition on Optical Communication, Sep. 22-26, 2013, 3 pages.

Foreign Communication From a Counterpart Application, PCT Application No. PCT/CN2015/079390, International Search Report dated Jul. 17, 2015, 7 pages.

Foreign Communication From a Counterpart Application, PCT Application No. PCT/CN2015/079390, Written Opinion dated Jul. 17, 2015, 5 pages.

Office Action dated May 10, 2016, 8 pages, U.S. Appl. No. 14/503,550, filed Oct. 1, 2014.

Office Action dated Jul. 8, 2016, 22 pages, U.S. Appl. No. 14/503,550, filed Oct. 1, 2014.

Notice of Allowance dated Nov. 8, 2016, 6 pages, U.S. Appl. No. 14/503,550, filed Oct. 1, 2014.

\* cited by examiner

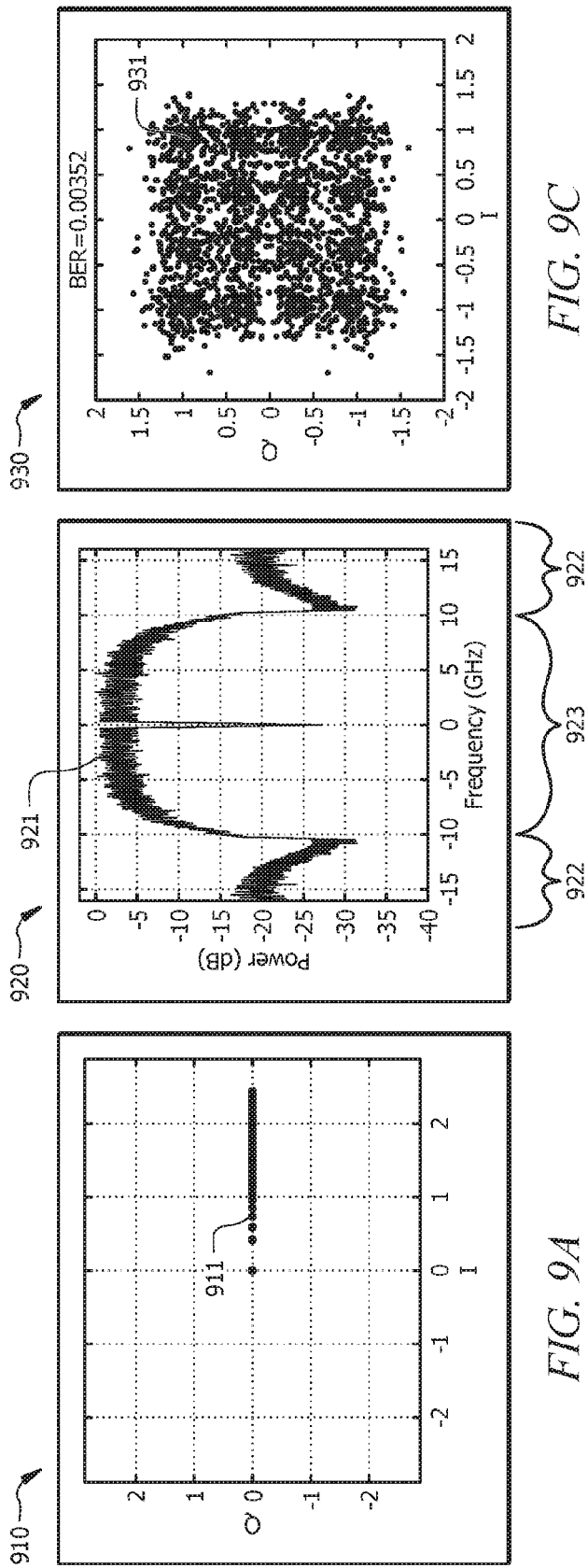

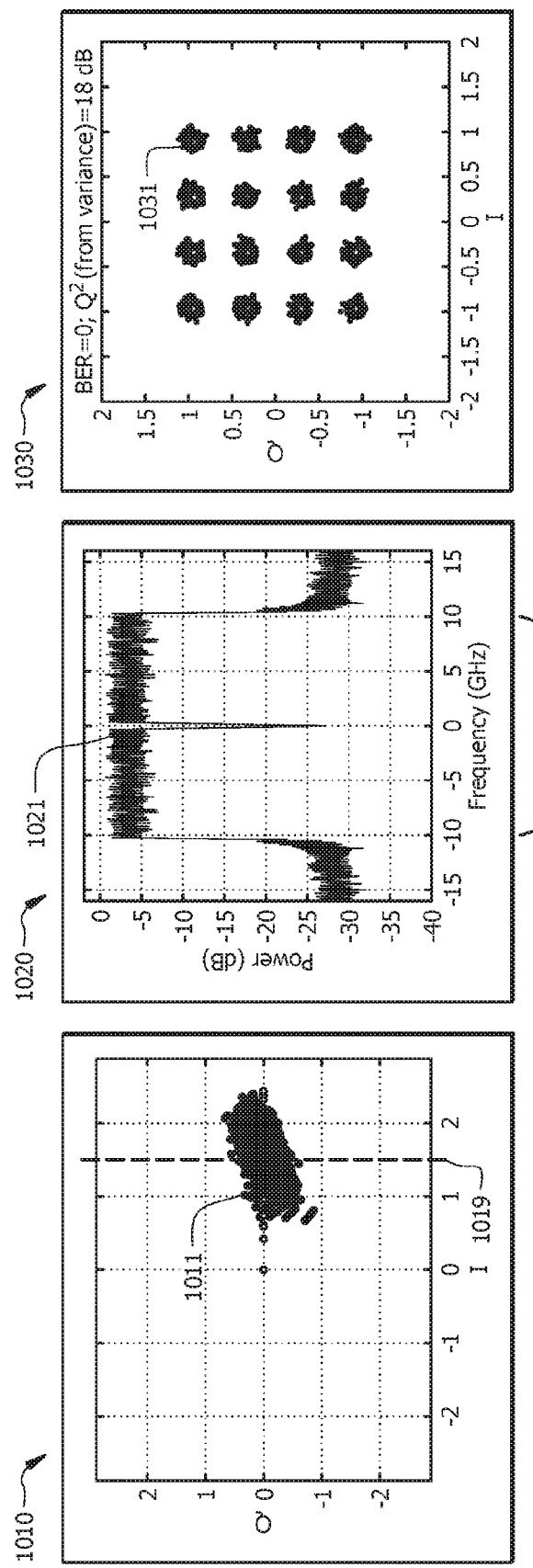

OPTICAL TRANSMITTER WITH OPTICAL RECEIVER-SPECIFIC DISPERSION PRE-COMPENSATION

CROSS-REFERENCE TO RELATED APPLICATIONS

This application is a divisional application of U.S. patent application Ser. No. 14/503,550 filed on Oct. 1, 2014 by Futurewei Technologies, Inc. and titled "Optical Transmitter with Optical Receiver-Specific Dispersion Pre-Compensation," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical access networks may be employed to deliver a wide variety of services, such as fiber to the home (FTTH), fiber to the building (FTTB), enterprise connectivity, business connectivity, and mobile back-haul and front-haul for fourth generation (4G) and/or next generation wireless communication. Continuous demands for higher network capacities and greater distance coverage pose challenges in current and future optical access network designs. For example, the effect of fiber transmission impairments may become more severe as the optical transmission speed and the transmission distance increase. Fiber transmission impairments may include chromatic dispersion (CD), polarization mode dispersion (PMD), phase noise, and non-linear effects. However, CD may be one of the most performance limiting factors, especially for high-speed transmissions at long distances.

CD may cause different spectral components (e.g., wavelengths) in an optical signal to travel through an optical fiber at different speeds and arrive at a receiver at different time instants (e.g., with different delays), and thus may temporally broaden the optical pulses that carry the data and lead to inter-symbol interference (ISI). Some systems may compensate CD in a fiber by employing another fiber of opposite-sign dispersion, but may be at the expense of increased loss, complexity, and cost. Recent advances in high-speed analog-to-digital converters (ADCs), high-speed digital-to-analog converters (DACs), and high performance digital signal processors (DSPs) have enabled fiber-optic impairments to be compensated digitally by DSPs.

The dispersion effect experienced by an optical signal when traveling through a given optical fiber link may be compensated through dispersion pre-compensation at a transmitter by an amount that is nominally the opposite of the fiber link dispersion. However, in typical optical access networks, the transmitter in an optical line terminal (OLT) may send time-division-multiplexed (TDM) signal blocks to multiple optical network units (ONUs), which may be located at different distances away from the OLT. Thus, the TDM blocks that are destined to different ONUs may experience different fiber link dispersions, and thus the OLT may not employ the same fiber dispersion pre-compensation for all the TDM blocks. In addition, direct-detection (DD) may be commonly employed at the ONUs' receivers, thus the OLT's transmitter may require an optical receiver-specific dispersion pre-compensation scheme that is suitable for DD receivers.

SUMMARY

In one embodiment, the disclosure includes an apparatus comprising a DSP unit configured to perform fiber dispersion pre-compensation on a digital signal sequence based on a dispersion value to produce a pre-compensated signal, wherein the dispersion value is associated with a remote optical receiver, a plurality of DACs coupled to the DSP unit and configured to convert the pre-compensated signal into analog electrical signals, and a frontend coupled to the DACs and configured to convert the analog electrical signals into a first optical signal, adding a constant optical electric (E)-field to the first optical signal to produce a second optical signal, and transmit the second optical signal to the remote optical receiver.

In another embodiment, the disclosure includes a method for use in an optical communication device comprising pre-compensating a first digital signal sequence destined for a first remote optical receiver according to a first CD value associated with the first remote optical receiver to produce a first pre-compensated digital signal, pre-compensating a second digital signal sequence destined for a second remote optical receiver according to a second CD value associated with the second remote optical receiver to produce a second pre-compensated digital signal, generating a pre-compensated optical signal from the first pre-compensated digital signal and the second pre-compensated digital signal by employing an optical intensity modulation scheme, and transmitting the pre-compensated optical signal to the first remote optical receiver and the second remote optical receiver via the optical network.

In yet another embodiment, the disclosure includes a method for use in an optical communication device comprising receiving an optical signal that is pre-compensated based on a CD associated with the device, converting the optical signal into electrical signals, and recovering a signal block from the electrical signals, wherein the electrical signals comprise a guard interval (GI) before the signal, and wherein the GI is based on the CD and at least one other CD associated with another device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9A illustrates an embodiment of a transmitter signal constellation plot for a 40 Gbps orthogonal frequency division multiplexing (OFDM) signal without pre-EDC.

FIG. 9B illustrates an embodiment of a receiver spectrum plot for a 40 Gbps orthogonal frequency division multiplexing (OFDM) signal without pre-EDC.

FIG. 9C illustrates an embodiment of a receiver subcarrier constellation plot for a 40 Gbps OFDM signal without pre-EDC.

FIG. 10A illustrates an embodiment of a transmitter signal constellation plot for a 40 Gbps OFDM signal with pre-EDC.

FIG. 10B illustrates an embodiment of a receiver spectrum plot for a 40 Gbps OFDM signal with pre-EDC.

FIG. 10C illustrates an embodiment of a receiver subcarrier constellation plot for a 40 Gbps OFDM signal with pre-EDC.

DETAILED DESCRIPTION

Figure 1:
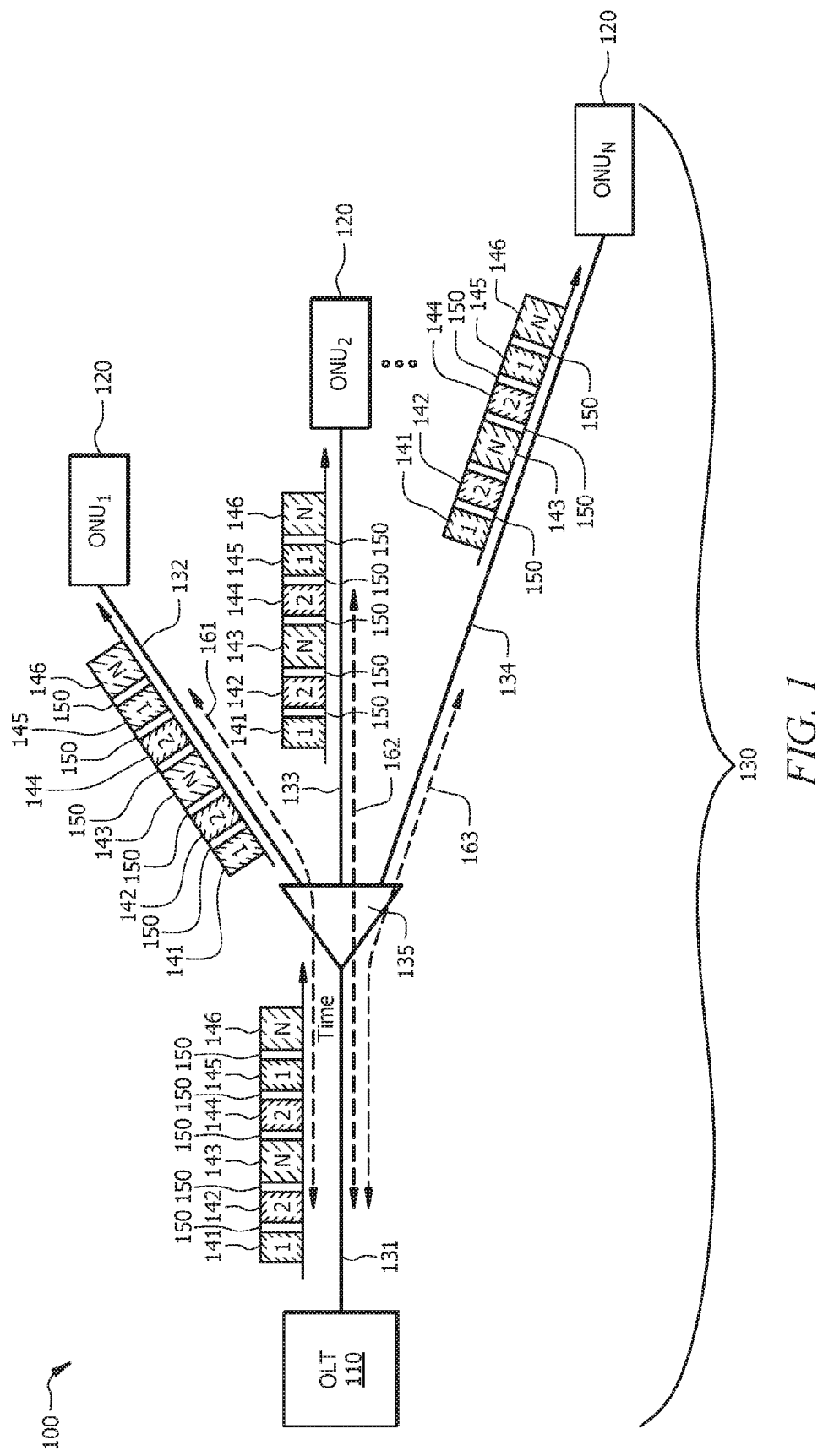
FIG. 1 is a schematic diagram of a passive optical network (PON) according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

One approach to providing high-speed wide-coverage optical access may be based on coherent solutions. Coherent solutions may provide higher power sensitivities and frequency selectivity, and thus may provide a higher data transmission rate, extend the maximum reach, and support more end-users in an optical access network than non-coherent solutions. Coherent solutions may include amplitude and phase information, whereas non-coherent solutions may include amplitude information, but not the phase information. In a coherent solution, a coherent OLT may encode data for different ONUs with different modulation formats, such as binary phase-shift keying (BPSK), quadrature phase-shift keying (QPSK), 16 quadrature amplitude modulation (16-QAM), or higher order modulation formats, and may employ polarization-division multiplexing (PDM) to achieve a maximum data rate for each ONU. A coherent ONU may employ digital signal processing techniques to condition the received signals, for example, by performing equalization to mitigate fiber dispersion and coherent detection to recover the original transmitted data from the received signals. Some of the digital signal processing techniques may be based on data-aided equalization, blind equalization, or adaptive equalization. An example of a coherent solution is described in F. Vacondio, et al., "Flexible TDMA access optical networks enabled by burst-mode software defined coherent transponders," European conference on optical communications (ECOC) 2013, which is incorporated herein by reference. In order to coherently detect a received optical signal, a coherent receiver may employ a local oscillator tuned to the phase of the transmitter, balanced detectors, high-speed ADCs, and DSPs for mitigating channel distortions in the electrical domain and the digital domain. Thus, coherent receivers may be complex and costly. In addition, current ONUs may be built for conventional DD (e.g., without phase recovery), and thus may not be equipped to perform coherent detection.

Disclosed herein are mechanisms for performing pre-EDC at an optical transmitter according to a receiver-specific or link-dependent fiber dispersion effect. The disclosed pre-EDC techniques may operate on the electric (E)-fields of a transmit signal and may be suitable for signals with any modulation format, such as on-off keying (OOK), n-level PAM (n-PAM), OFDM, discrete multi-tone (DMT), duobinary, different phase-shift keying (DPSK), differential quadrature phase-shift keying (DQPSK) or other modulation formats suitable for DD. In an embodiment, an OLT may determine an amount of fiber dispersion for each connected ONU and may pre-compensate each downstream (DS) signal prior to transmission to account for a fiber dispersion effect between the OLT and the ONU destined to receive the DS signal such that the ONU may receive the DS signal with close to zero fiber dispersion effect, where the DS may refer to the transmission direction from the OLT to the ONU. To facilitate the dispersion pre-compensation of different signal blocks or different segments destined to different ONUs, the OLT may insert guard intervals (GIs) between signal blocks that are destined for different ONUs. Since the pre-EDC is performed at an optical transmitter, the disclosed pre-EDC techniques may be compatible with any type of optical receivers, such as conventional DD receivers and coherent receivers. In an embodiment, the OLT may employ a Mach-Zehnder Interferometer (MZI)-structured optical transmitter comprising a DC carrier branch positioned in parallel with an in-phase/quadrature-phase (I/Q) modulator to improve transmitter power efficiency, reduce the power loss associated with the modulation, and enable the employment of lower resolution DACs and DSPs. For example, a fiber dispersion pre-compensated signal may be separated into a direct current (DC) component and a DC-free pre-compensated signal component, where the DC-free pre-compensated signal component may be optically modulated via the I/Q modulator and the DC component may be optically added via the DC carrier branch to reproduce the desired pre-compensated signal. In addition, the OLT may employ automatic bias control to facilitate the use of the modulator. The disclosed embodiments may provide wide-coverage (e.g., up to about 100 kilometers (km)) high-speed (e.g., greater than about 10 gigabits per second (Gbps)) optical access with close to zero dispersion penalty and may enable the ONUs to reuse existing resources (e.g., with no modification to the ONU receiver architectures) or to be upgraded with minimal modifications. It should be noted that the present disclosure may describe the embodiments in the context of an OLT, but the disclosed embodiments may be applicable to transmitters in ONUs or any other optical communication devices.

FIG. 1 is a schematic diagram of a PON 100 according to an embodiment of the disclosure. The PON 100 may comprise an OLT 110, a plurality of ONUs 120 (e.g., ONU$_1$, ONU$_2$, ONU$_N$), and an ODN 130, which may be coupled to the OLT 110 and the ONUs 120. The PON 100 may be a communication network that does not require any active components to distribute data between the OLT 110 and the ONUs 120. Instead, the PON 100 may use the passive optical components in the ODN 130 to distribute data between the OLT 110 and the ONUs 120. The PON 100 may be a Next Generation Access (NGA) system, such as a ten Gbps gigabit PON (XGPON), which may have a downstream bandwidth of about ten Gbps and an upstream bandwidth of at least about 2.5 Gbps. Alternatively, the PON 100 may be any Ethernet-based network, such as an Ethernet passive optical network (EPON), a 10 Gigabit EPON (10 GEPON), an asynchronous transfer mode PON (APON), a broadband PON (BPON), a GPON, or a wavelength division multiplexed (WDM) PON (WPON).

The OLT 110 may be any device configured to communicate with the ONUs 120 and another backbone network (e.g., the Internet). Specifically, the OLT 110 may act as an intermediary between the backbone network and the ONUs 120. For instance, the OLT 110 may forward data received from the backbone network to the ONUs 120, and forward data received from the ONUs 120 onto the backbone network. Although the specific configuration of the OLT 110 may vary depending on the type of PON 100, the OLT 110 may comprise an optical transmitter and an optical receiver. When the backbone network employs a network protocol, such as Ethernet or synchronous optical networking/synchronous digital hierarchy (SONET/SDH), that is different from the PON protocol used in the PON 100, the OLT 110 may comprise a converter that may convert the network protocol into the PON protocol. The OLT 110 converter may also convert the PON protocol into the network protocol. The OLT 110 may be located at a central location, such as a central office, but may be located at other locations as well.

The ODN 130 may be a data distribution system. For example, the ODN 130 may comprise a feeder fiber 131, a plurality of drop fibers 132, 133, and 134, and a splitter 135 that couples the feeder fiber 131 to the drop fibers 132, 133, and 134. The feeder fiber 131 and the drop fibers 132, 133, and 134 may be any optical fiber cables that transport optical signals carrying data between the OLT 110 and the ONUs 120. The splitter 135 may be any optical coupler (e.g., a directional coupler or a multi-mode interference (MMI) coupler) configured to split a light signal into one or more portions, each carried via one of the drop fibers 132, 133, and 134. The ODN 130 may further comprise other distributors, couplers, and other equipment (not shown). As shown in FIG. 1, the ODN 130 may extend between the OLT 110 and the ONUs 120 via three optical transport links 161, 162, and 163. For example, the optical transport link 161 may transport optical signals from the OLT 110 to the ONU 120 along the feeder fiber 131 and the drop fiber 132, the optical transport link 162 may transport optical signals from the OLT 110 to the ONU 120 along the feeder fiber 131 and the drop fiber 133, and the optical transport link 163 may transport optical signals from the OLT 110 to the ONU 120 along the feeder fiber 131 and the drop fiber 134. It should be noted that the ODN 130 may be arranged as shown in FIG. 1 or in any other suitable arrangement.

The ONUs 120 may be any devices configured to communicate with the OLT 110 and a customer or an end-user. Specifically, the ONUs 120 may act as an intermediary between the OLT 110 and the customer. For instance, the ONUs 120 may forward data received from the OLT 110 to the customer, and forward data received from the customer to the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to and from a customer device. The ONUs 120 may be located at distributed locations, such as the customer premises, but may be located at other locations as well.

Each of the optical transport links 161, 162, and 163 may comprise a fiber dispersion effect due to the use of fibers 131, 132, 133, and 134 as transmission media and the different propagation velocities among different signal components along the fibers 131, 132, 133, and 134. For example, the OLT 110 may transmit a lightwave signal comprising a plurality of light pulses, each carrying a data symbol, to an ONU 120. When the lightwave signal propagates along the optical transport links 161, 162, or 163, the CD effect may cause the light pulses to spread in time (e.g., a pulse broadening effect), and thus the ONU 120 may receive adjacent light pulses that are overlapped or adjacent data symbols that interfere (e.g., ISI or CD-induced interference) with each other. As such, the ONU 120 may not be able to recover the original data without error or may not recover the original data at all when the ISI is substantially strong. In order to reverse or remove the CD effect, the CD effect may be compensated or removed at the ONU 120's receiver or pre-compensated at the OLT 110's transmitter. However, many of today's ONUs may employ a conventional DD receiver architecture to achieve low cost and low complexity, thus may not be equipped with a coherent receiver architecture to perform CD compensation. Thus, incorporating CD pre-compensation at the OLT 110's transmitter may be a more suitable or cost-effective solution by obviating the increased cost and complexity at the many ONUs 120's receivers. It should be noted that the CD effect may increase with fiber lengths, as well as data speed (e.g., baud rate).

Each of the optical transport links 161, 162, 163 may comprise a different CD effect due to different fiber path lengths, and thus each ONU 120 may receive a different CD effect. One approach to pre-compensating DS signals may be to account for the CD effect according to the recipients (e.g., destined ONUs 120) of the DS signals. For example, the optical transport link 161, 162, or 163 may comprise an amount of CD represented by $D_1$, $D_2$, or $D_3$, respectively. Thus, the OLT 110 may pre-compensate a transmit signal with a CD in the amount of $D_1$ when the transmit signal is destined to an ONU 120 (e.g., $ONU_1$) connecting to the OLT 110 via the optical transport link 161. Similarly, the OLT 110 may pre-compensate a transmit signal with a CD in the amount of $D_2$ when the transmit signal is destined to an ONU 120 (e.g., $ONU_2$) connecting to the OLT 110 via the optical transport link 162, and the OLT 110 may pre-compensate a transmit signal with a CD in the amount of $D_3$ when the transmit signal is destined to an ONU 120 (e.g., $ONU_N$) connecting to the OLT 110 via the optical transport link 163. As such, each ONU 120 may receive DS signals from the OLT 110 with a minimal CD effect or close to zero CD effect. Thus, the ONUs 120 may employ the conventional DD receiver architecture without modifications.

The OLT 110 may obtain the amount of CD in the optical transport links 161, 162, and 163 via several mechanisms. For example, the CD effect may be measured by test equipment during an initial set up or installation of an ONU 120, where the test equipment may send a test signal to the ONU 120 and measure the delay in the returned signal. Alternatively, the OLT 110 may measure the amount of CD when the ONU 120 joins the network during a network discovery phase by iteratively adjusting the amount of CD for pre-compensation and determining an optimum estimate for the amount of CD.

The OLT 110 may perform dynamic bandwidth allocation to assign upstream (US) transmission bandwidths and DS transmission bandwidths to the ONUs 120. US may refer to the transmission direction from the ONUs 120 to the OLT 110. In an embodiment, the OLT 110 may employ a time-division multiple access (TDMA) scheme for DS transmission. In the TDMA scheme, the DS channel or transmission bandwidth may be shared among the ONUs 120 by dividing the DS channel into a plurality of time slots 141, 142, 143, 144, 145, and 146, each designated for one of the ONUs 120. For example, the time slots 141 and 145 may be designated for a first of the ONUs 120 (e.g., $ONU_1$), the time slots 142 and 144 may be designated for a second of the ONUs 120 (e.g., $ONU_2$), and the time slots 143 and 146 may be designated for a third of the ONUs 120 (e.g., $ONU_N$). Each ONU 120 may detect, decode, and de-encapsulate the OLT 110 DS data and may filter out data packets that are not destined to the ONU 120 or the ONU 120's user clients. It should be noted that the OLT 110 may employ other access scheme separately or in combination with the TDMA scheme to communicate with the ONUs 120.

In addition to pre-compensating DS signals to account for fiber dispersion, the OLT 110 may insert GIs 150 between each of the time slots 141-146 to reduce CD-induced interference between adjacent signal blocks, where the GIs 150 may be larger than the CD-induced pulse broadening duration, $\Delta T_{CD}$. For example, a symbol period may be represented by $T_S$, which may be determined by the data speed or the baud rate, and the CD-induced interference may cause the symbol to span a period, $T_{CD}$, that is greater than $T_S$, where the CD-induced pulse broadening duration may be referred to as the difference between $T_{CD}$ and $T_S$ (e.g., $\Delta T_{CD} = T_{CD} - T_S$).

The OLT 110 may insert the GIs 150 with different durations between adjacent timeslots 141-146 according to the ONUs 120 that are assigned to the adjacent time slots. For example, each GI 150 may be configured to be a value larger than about 50 percent (%) of the sum of the pulse broadening durations of the ONUs 120 that are assigned to the adjacent time slots as shown below:

$$GI > 0.5 \times (\Delta TC_{CD}(i) + \Delta TC_{CD}(i+1)), \quad (1)$$

where $\Delta TC_{CD}(i)$ may represent the pulse broadening duration for a first ONU 120 assigned to a time slot i and $\Delta TC_{CD}(i+1)$ may represent the pulse broadening duration for a second ONU 120 assigned to a time slot i+1 subsequent to the time slot i.

Alternatively, all GIs 150 may be configured with a same duration that is larger than a mean of the pulse broadening durations for all ONUs 120 as shown below:

$$GI > mean(\Sigma_i \Delta TC_{CD}(i)). \quad (2)$$

In addition, the OLT may configure the durations of the GIs 150 to be an integer multiples of the data symbol period (e.g., $m \times T_S$, where m is an integer) such that the ONUs 120 timing recovery circuitries may remain phase-locking after the reception of the GIs 150.

In some embodiments, the PON 100 may be coupled to a coaxial network to form a hybrid access network, such as an Ethernet PON over Coaxial (EPoC) network. In a hybrid access network, a coaxial line terminal (CLT) may act as an intermediary between the OLT 110 and coaxial network units (CNUs) that are connected to the coaxial network. The CLT may forward data received from the OLT 110 to the CNUs and forward data received from the CNUs to the OLT 110. The OLT 110 may assign US transmission bandwidths and DS transmission bandwidths to the CLT by employing substantially similar scheduling mechanisms as for the ONUs 120. In addition, the OLT 110 may employ similar fiber dispersion pre-compensation mechanisms when transmitting DS signals to the CLT.

Figure 2:
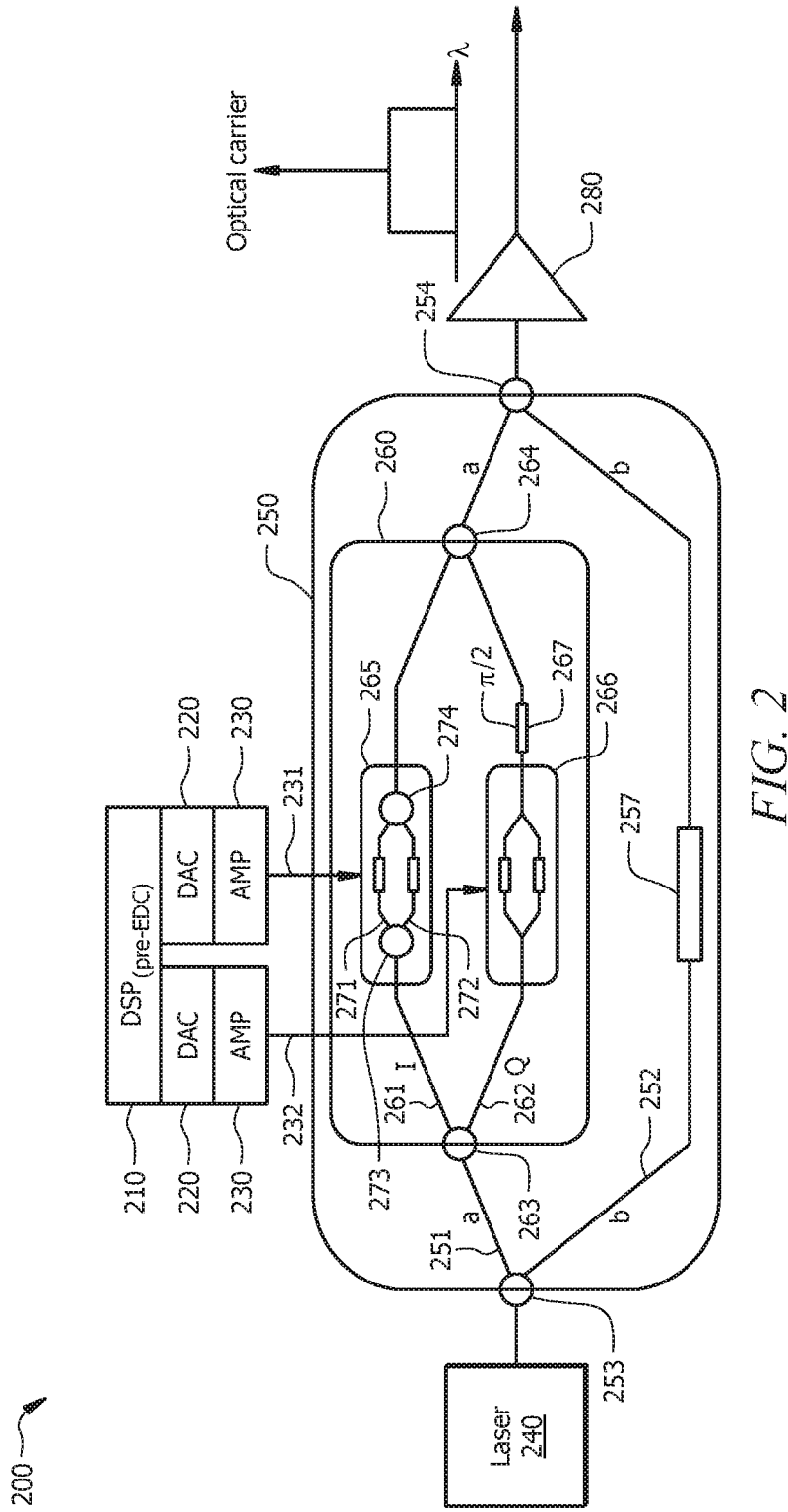
FIG. 2 is a schematic diagram of an embodiment of an optical transmitter.

FIG. 2 is a schematic diagram of an embodiment of an optical transmitter 200, which may be employed by an OLT, such as the OLT 110, an ONU, such as the ONU 120, a CLT in an EPoC network, or any other optical communication device. The transmitter 200 may be used to modulate and transmit data as optical signals and pre-compensate fiber dispersions prior to transmitting the optical signals. The transmitter 200 may comprise a DSP unit 210, two DACs 220, two electrical amplifiers 230 (shown as AMP), a laser 240, an optical modulation section 250, and an optical amplifier 280, where the laser 240, the optical modulation section 250, and the optical amplifier 280 may be referred to as the frontend.

The DSP unit 210 may be configured to perform digital signal processing functions and may comprise one or more DSPs and/or other logic circuits. The transmitter 200 may receive an input data stream from a data source or a data generation unit (not shown). The DSP unit 210 may map the data information bits to data symbols according to a predetermined modulation scheme (e.g., OOK, n-PAM, DMT, duobinary, DPSK, DQPSK) to produce E-fields that are suitable for optical modulation and transmission and may pre-compensate the E-fields to produce pre-compensated signals, as described more fully below. Since the fiber dispersion pre-compensation is performed in the digital electrical domain, the fiber dispersion pre-compensation may be referred to as pre-EDC. The DSP unit 210 may perform pre-EDC according to a fiber dispersion effect that is dependent on or specific to the recipient of the input data stream or the destination optical receiver, as described more fully below. It should be noted that the pre-compensated signals may comprise a real component and an imaginary component.

The DACs 220 may be coupled to the DSP unit 210 and may convert the fiber dispersion pre-compensated signals into analog electrical signals 231 and 232. For example, a first of the DACs 220 may convert the real component into the electrical signal 231 and a second of the DACs 220 may convert the imaginary component into the electrical signal 232. The electrical amplifiers 230 may be positioned between the DACs 220 and the optical modulation section 250 and may be configured to amplify the analog electrical signals to produce suitable voltage levels for driving the optical modulation section 250.

The optical modulation section 250 may be coupled to the laser 240. The laser 240 may be a light source configured to produce a lightwave signal that comprises a substantially constant amplitude, frequency, and phase. The optical modulation section 250 may be configured to modulate the lightwave signal according to the voltage signals. For example, the lightwave signal may be referred to as the optical carrier that carries the voltage signals converted from the data information bits.

The optical modulation section 250 may comprise an MZI structure comprising an upper interferometer arm 251, a lower interferometer arm 252, a first optical splitter 253, and a first optical combiner 254. The optical modulation section 250 may be configured to receive the lightwave signal from the laser 240. The first optical splitter 253 may be a directional coupler, an MMI, or a power splitter configured to split the lightwave signal into a first portion and a second portion, where the first portion may propagate along the upper interferometer arm 251 and the second portion may propagate along the lower interferometer arm 252. The first optical combiner 254 may be substantially similar to the first optical splitter 253, but may be configured to combine optical signals instead of split an optical signal.

The optical modulation section 250 may further comprise an I/Q modulator 260 coupled to the upper interferometer arm 251. The I/Q modulator 260 may comprise a nested Mach-Zehnder modulator (MZM) structure, similar to a standard I/Q modulator. For example, the I/Q modulator 260 may comprise a second optical splitter 263, an I branch 261, a Q branch 262, a second optical combiner 264, and MZMs 265 and 266. The I branch 261 and the Q branch 262 may be positioned about parallel to each other and between the second optical splitter 263 and the second optical combiner 264. The MZM 265 may be coupled to the I branch 261 and the MZM 266 may be coupled to the Q branch 262. The second optical splitter 263 and the second optical combiner 264 may be substantially similar to the first optical splitter 253 and the first optical combiner 254, respectively.

The I/Q modulator 260 may be configured to receive the first portion of the lightwave signal produced by the laser 240. The second optical splitter 263 may be configured to split the first portion of the lightwave signal into two about equal portions (e.g., a 50:50 splitting ratio), a third portion and a fourth portion, where the third portion may propagate along the I branch 261 and the fourth portion may propagate along the Q branch 262.

The MZM 265 may comprise a pair of interferometer arms 271 positioned between a third optical splitter 273, similar to the first optical splitter 253, and a third optical combiner 274, similar to the first optical combiner 254. The MZM 265 may be configured to modulate the third portion of the lightwave signal according to the electrical signal 231 to produce an I component. For example, the third optical splitter 273 may split the third portion of the lightwave signal into two about equal portions, each propagating along an optical path provided by one of the interferometer arms 271. The electrical signal 231 may be applied to a first of the interferometer arms 271 (e.g., via an electrode (not shown)) to cause phase changes (e.g., phase modulation) in the first interferometer arm 271. By combining the optical paths of the interferometer arms 271 and 272, the MZM 265 may convert the phase modulation into an intensity modulation, in which the optical power at the output of the MZM 265 may vary according to the electrical signal 231.

The MZM 266 may comprise a similar structure as in the MZM 265 and may be configured to modulate the fourth portion of the lightwave signal according to the electrical signal 232 to produce a Q component by employing similar intensity modulation mechanisms as in MZM 265.

The I/Q modulator 260 may further comprise a first phase shifter 267 coupled to the Q branch 262 to provide a phase shift or delay of about $\pi/2$ radians between the I branch 261 and the Q branch 262. The second optical combiner 264 may be configured to combine the I and Q components to produce an I/Q modulated optical signal.

The optical modulation section 250 may further comprise a second phase shifter 257 coupled to the second interferometer arm 252 and configured to bias the second interferometer arm 252 such that the second interferometer arm 252 may comprise a zero phase with respect to the I branch 261. The second interferometer arm 252 may be employed for providing a DC bias for the I/Q modulator 260 by adjusting the second phase shifter 257. Thus, the lower interferometer arm 252 may be referred to as a DC carrier arm and the second phase shifter 257 may be referred to as a DC element.

The pre-compensated signals or E-fields generated by the DSP unit 210 may comprise a DC component (e.g., a non-zero mean value), as described more fully below. In order to minimize the resolution of the DACs 220 and to improve power efficiency of the optical modulation section 250, the DSP unit 210 may be configured to remove or separate the DC component from the pre-compensated signal to produce a DC-free pre-compensated signal component with a smaller signal range. The I/Q modulator may modulate the DC-free pre-compensated signal component and the second interferometer arm 252 may be configured to provide a constant optical E-field (e.g., in an equivalent amount as the DC component), which may be optically added via the first optical combiner 254.

The transmitter 200 may further comprise an optical amplifier 280 coupled to the first optical combiner 254 and configured to provide a suitable optical signal amplification for transmission over an optical network, such as the PON 100.

In order to minimize power loss at the transmitter 200, the first optical splitter 253 may be configured to provide a power splitting ratio between the first interferometer arm 251 and the second interferometer arm 252 such that the peak-to-peak drive voltage swing for each of the I branch 261 and the Q branch 262 may be about or slightly higher than the voltage for inducing a phase change of $\pi$ (e.g., the half-wave voltage $V\pi$). It should be noted that the transmitter 200 may provide a significantly lower power loss when compared to a standard I/Q modulator transmitter (e.g., without the second interferometer arm 252) since the modulation depth (e.g., amplitude ratio between the electrical voltage signals and the optical carrier signal) of a standard I/Q modulator may be more limited due to the non-linear transfer function characteristics of MZMs.

The transmitter 200 may be configured to provide a constant optical E-field (e.g., a fixed DC bias) at the second interferometer arm 252 by configuring a suitable splitting ratio for the first optical splitter 253 and/or the first optical combiner 254. In such an embodiment, the output power of the two electrical amplifiers 230 may be adjusted to further scale the DC-free pre-compensated signal component based on the amount of the constant optical E-field such that the fiber dispersion pre-compensated signal is correctly reproduced at the output of the optical modulation section 250. It should be noted that for optical signals that do not have DC components in their E-fields, such as duobinary, DPSK, and DQPSK, the DC carrier arm may not be required.

The transmitter 200 may further comprise an automatic bias controller (not shown) coupled to the optical modulation section 250 to provide automatic bias control for the optical modulation section 250. For example, the automatic bias control may be realized by dithering the bias (e.g., through a low-frequency dither tone) of the Q branch 262, monitoring the dither tone at the output of the optical modulation section 250, and controlling the bias at the first phase shifter 267 to minimize the dither tone at the output of the optical modulation section 250.

Figure 3:
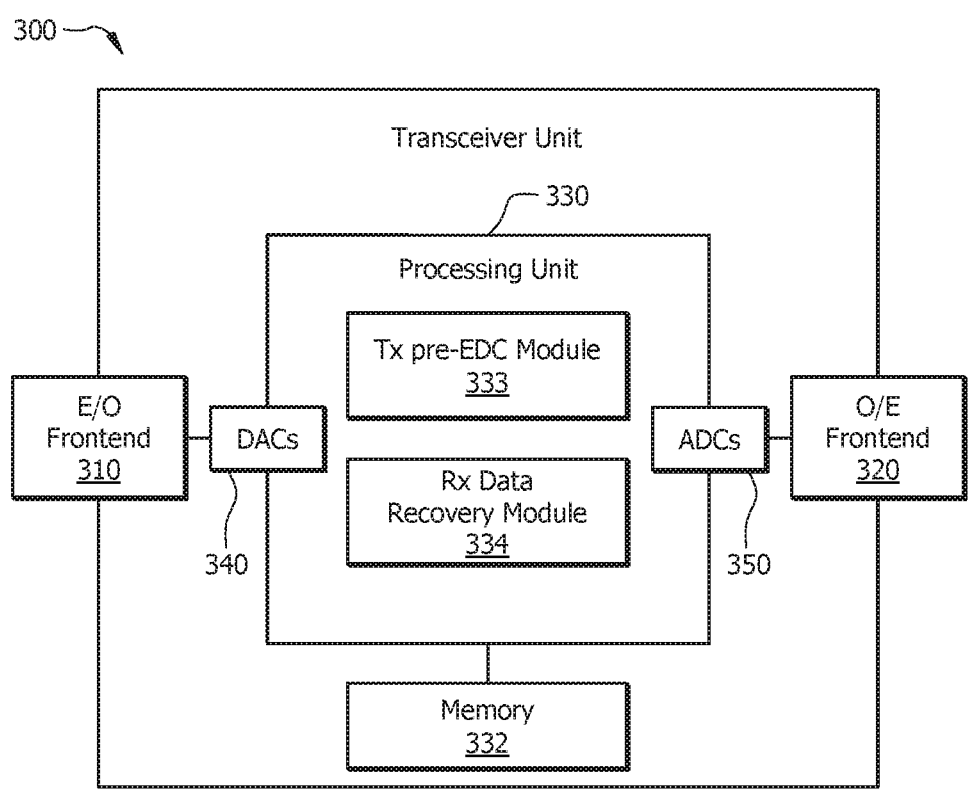
FIG. 3 is a schematic diagram of an embodiment of a transceiver unit.

FIG. 3 is a schematic diagram of an embodiment of a transceiver unit 300, which may be any device that transmits and/or receives optical signals carrying encoded data. For example, the transceiver unit 300 may be located in an optical communication device, such as the OLT 110, the ONU 120, a CLT in an EPoC network, or any other optical network element suitable for use in a PON, such as the PON 100, or any other optical transport network (OTN), and/or may comprise the optical transmitter 200. The transceiver unit 300 may also be configured to implement or support any of the schemes described herein, such as method 400, 500, and/or 600, as discussed more fully below. One skilled in the art will recognize that the term transceiver unit encompasses a broad range of devices of which transceiver unit 300 is merely an example. Transceiver unit 300 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 300. For instance, the features and methods in the disclosure may be implemented using hardware, firmware, and/or software installed to run on hardware. As shown in FIG. 3, the transceiver unit 300 may comprise an electrical-to-optical (E/O) frontend 310 and/or an optical-to-electrical (O/E) frontend 320, which may convert an electrical signal to an optical signal for transmission in an OTN and/or receive an optical signal from the OTN and convert the optical signal to an electrical signal, respectively. A processing unit 330 may be coupled to the E/O frontend 310 and the O/E frontend 320 via a plurality of DACs 340, similar to DACs 220, and ADCs 350, respectively, which may or may not be part of the processing unit 330. The DACs 340 may convert digital electrical signals generated by the processing unit 330 into analog electrical signals that may be fed into the E/O frontend 310. The ADCs 350 may convert analog electrical signals received from the O/E frontend 320 into digital electrical signals that may be processed by the processing unit 330. The processing unit 330 may comprise one or more processors, which may include general processors, single-core processors, multi-core processors, application-specific integrated circuits (ASICs), and/or DSPs. The processing unit 330 may comprise a transmit (Tx) pre-EDC module 333, which may implement the method 400 and/or 500, and/or a receive (Rx) data recovery module 334, which may implement the method 600, channel equalization, timing recovery, demodulation, and/or data decoding to recover the original transmitted data. In an alternative embodiment, the Tx pre-EDC module 333 and the Rx data recovery module 334 may be implemented as instructions stored in the memory module 332, which may be executed by the processing unit 330. The memory module 332 may comprise a cache for temporarily storing content, e.g., a random access memory (RAM). Additionally, the memory module 332 may comprise a long-term storage for storing content relatively longer, e.g., a read only memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 300, at least one of the processing unit 330 and/or memory module 332 are changed, transforming the transceiver unit 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 4:
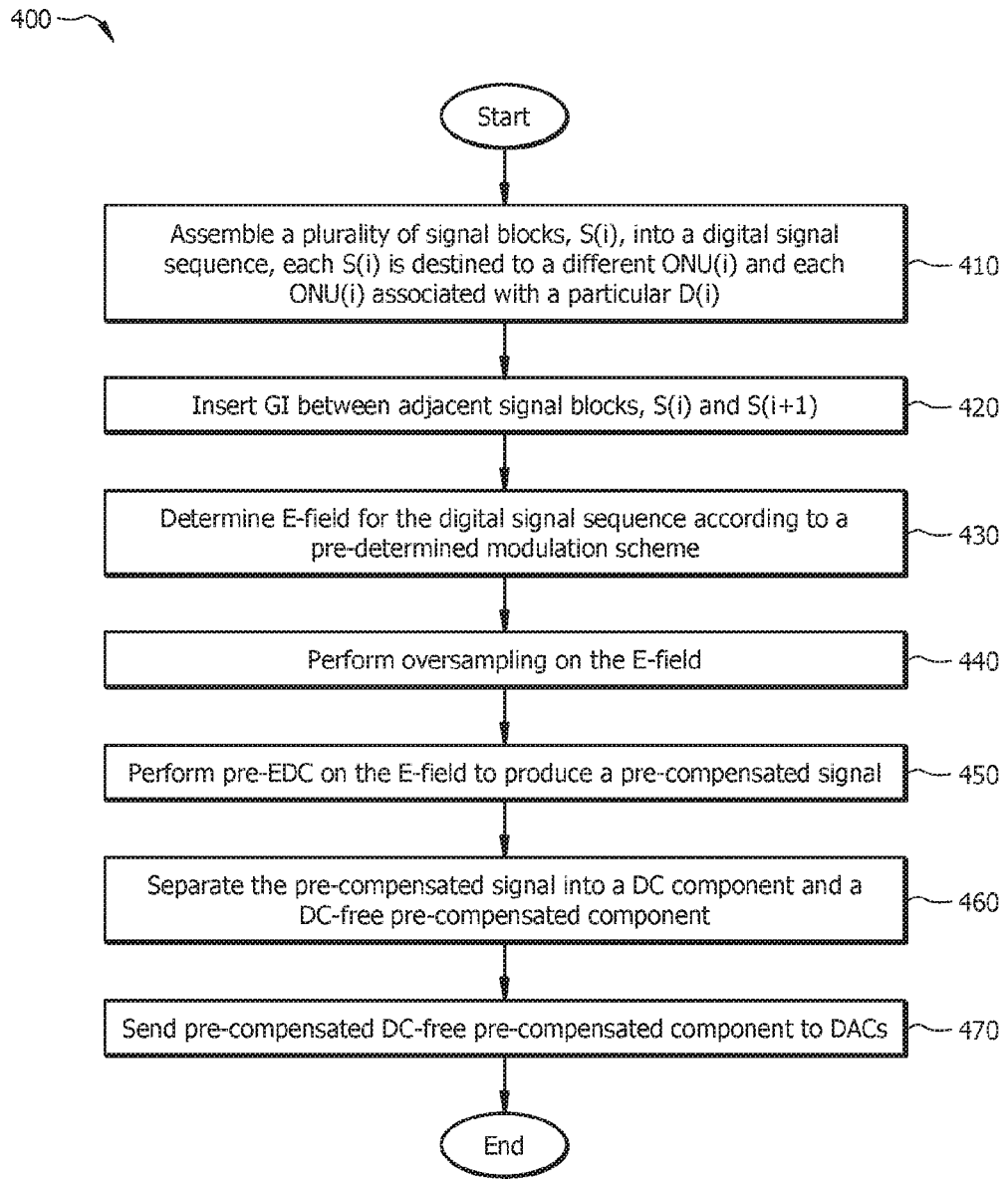
FIG. 4 is a flowchart of an embodiment of a method for performing electronic dispersion pre-compensation (pre-EDC).

FIG. 4 is a flowchart of an embodiment of a method 400 for performing pre-EDC, which may be implemented at an optical transmitter, such as the optical transmitter 200 or the transceiver unit 300, and may be employed by an OLT, such as the OLT 110, or at an ONU, such as the ONU 120. The method 400 may be suitable for implementing in a DSP unit, such as the DSP unit 210 or the processing unit 330. The method 400 may be described in the context of the OLT, but similar mechanisms may be applied to the ONU. The OLT may be connected to a plurality of ONUs, each associated with an ONU-specific fiber dispersion effect depending on the optical path between the OLT and the ONU. The method 400 may pre-compensate each DS signal prior to transmission to account for a particular amount of fiber dispersion according to the ONU that is assigned with the DS signal. The method 400 may begin with a set of known or predetermined ONU-specific dispersion values, D(i), each associated with a specific ONU, ONU(i), where i may be an integer value that varies from 1 to N.

At step 410, method 400 may assemble a plurality of signal blocks, S(i), into a digital signal sequence, where each S(i) may be destined to a different ONU(i) and each ONU(i) may be associated with a particular dispersion value, D(i). At step 420, method 400 may insert GIs between adjacent signal blocks, S(i) and S(i+1). As described above, the fiber dispersion effect may cause pulse broadenings, where the dispersion-induced broadening periods may be represented as $\Delta T_{CD}(i)$ for an ONU(i). The method 400 may configure the GIs to be greater than $\Delta T_{CD}(i)$ to further mitigate ISI between adjacent signal blocks. For example, method 400 may insert a GI between adjacent signal blocks, S(i) and S(i+1), where the GI may be configured such that the duration of the GI may be greater than about 50% of the sum of the pulse broadening periods $\Delta T_{CD}(i)$ and $\Delta T_{CD}(i+1)$ as described in Equation (1). Alternatively, method 400 may configure all GIs with the same time duration, where the time duration may be a mean of all the pulse broadening periods $\Delta T_{CD}(i)$ as described in Equation (2). In addition, method 400 may configure the GIs such that the GIs may comprise integer multiples of a symbol period to simplify timing recovery at the ONU receivers.

At step 430, method 400 may determine an E-field for the digital signal sequence according to a pre-determined modulation scheme. It should be noted that the E-field may comprise a real component (e.g., an I component) and an imaginary component (e.g., a Q component) depending on the selected modulation scheme. For example, when the selected modulation scheme is an OOK scheme, the E-field of the signal sequence may comprise an I component that varies between two values, one representing a bit value of 0 and another representing a bit value of 1.

At step 440, method 400 may perform oversampling on the E-field to increase resolution. For example, method 400 may employ a 2× oversampling. At step 450, after performing oversampling, method 400 may perform pre-EDC on the oversampled E-field of the signal sequence to produce a pre-compensated digital signal. Method 400 may pre-compensate the E-field for each S(i) according to a corresponding D(i) associated with ONU(i). Since CD may be dependent on fiber lengths and may be substantially temporally static, the compensating dispersion values of pre-EDC may be pre-determined, e.g., at the system initiation phase.

The method 400 may determine a plurality of frequency domain filters, each corresponding to a given compensating dispersion value, $D_{pre}(i)$, that is opposite to one of the ONU-specific dispersion values, D(i) (e.g., $D_{pre}(i)=-D(i)$). After determining the frequency domain filters, method 400 may transform each signal block into a frequency sequence via a fast Fourier transformer (FFT), select a frequency domain filter according to $D_{pre}(i)$, pre-compensate the frequency sequence by filtering the frequency sequence with the selected frequency domain filter. After pre-compensating the frequency sequence, method 400 may convert the pre-compensated frequency sequence to a time domain digital signal sequence via an inverse FFT (IFFT). In some embodiments, method 400 may additionally perform other frequency-response equalization and other non-linearity compensation. The frequency domain compensation or equalization may be performed by employing an overlap-and-add approach or an overlap-and-save approach. It should be noted that the frequency domain filters may be static filters, but may be updated during a network reconfiguration (e.g., changes in physical configuration, such as fiber length change).

At step 460, after performing the pre-EDC, method 400 may separate the pre-compensated signal into a DC component and a DC-free component (e.g., comprising a real component and an imaginary component) to enable the use of lower resolution and/or lower cost DACs. It should be noted that for optical signals that do not have DC components in their E-fields, such as duobinary, DPSK, and DQPSK, the step 460 may be skipped.

At step 470, method 400 may send the DC-free pre-compensated component to DACs, such as the DACs 220. For example, method 400 may send the real component to one DAC and the imaginary component to another DAC for digital-to-analog conversion to produce analog electrical signals. For example, the DACs may be coupled to an I/Q modulator, similar to the I/Q modulator 260 in the transmitter 200, for optical I/Q modulation and the DC component may be optically added via a DC bias element, similar to the second interferometer arm 252 in the transmitter 200. It should be noted that the steps 440 and 460 may be optional and the method 400 may be operated in the order as shown or any other suitable order as determined by a person of ordinary skill in the art.

Figure 5:
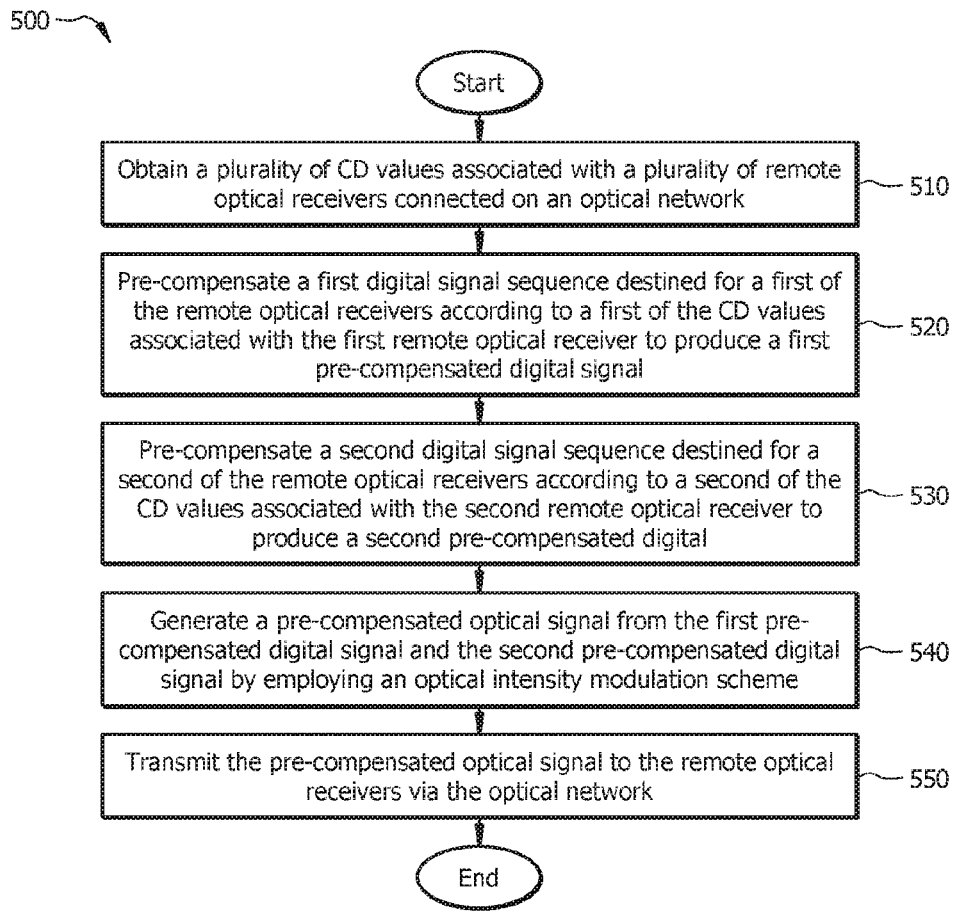
FIG. 5 is a flowchart of another embodiment of a method for performing pre-EDC.

FIG. 5 is a flowchart of another embodiment of a method 500 for performing pre-EDC. The method 500 may be similar to the method 400 and may be implemented at an optical transmitter, such as the optical transmitter 200 or the transceiver unit 300, and may be employed by an OLT, such as the OLT 110, or at an ONU, such as the ONU 120. At step 510, method 500 may begin with obtaining a plurality of CD values associated with a plurality of remote optical receivers connected on an optical network, such as the PON 100. For example, the amount of CD for each remote optical receiver may be measured during an initial set up or installation of the remote optical receiver via test equipment and the CD values may be input to the OLT. Alternatively, method 500 may measure the amount of CD during a network discovery phase when the remote optical receiver joins the network during a network discovery phase, for example, by iteratively adjusting the amount of CD for pre-compensation and determining an optimum estimate for the amount of CD.

At step 520, method 500 may pre-compensate a first digital signal sequence destined for a first of the remote optical receivers according to a first of the CD values associated with the first remote optical receiver to produce a first pre-compensated digital signal. At step 530, method 500 may pre-compensate a second digital signal sequence destined for a second of the remote optical receivers according to a second of the CD values associated with the second remote optical receiver to produce a second pre-compensated digital signal. For example, method 500 may pre-compensate the first digital signal sequence and the second digital signal sequence in the frequency domain by employing substantially similar mechanisms as described in step 450 of the method 400.

At step 540, method 500 may generate a pre-compensated optical signal from the first pre-compensated digital signal and the second pre-compensated digital signal by employing an I/Q modulation scheme, for example, via a I/Q modulator, such as the I/Q modulator 260. At step 550, method 500 may transmit the optical signal to the remote optical receivers via the optical network.

Figure 6:
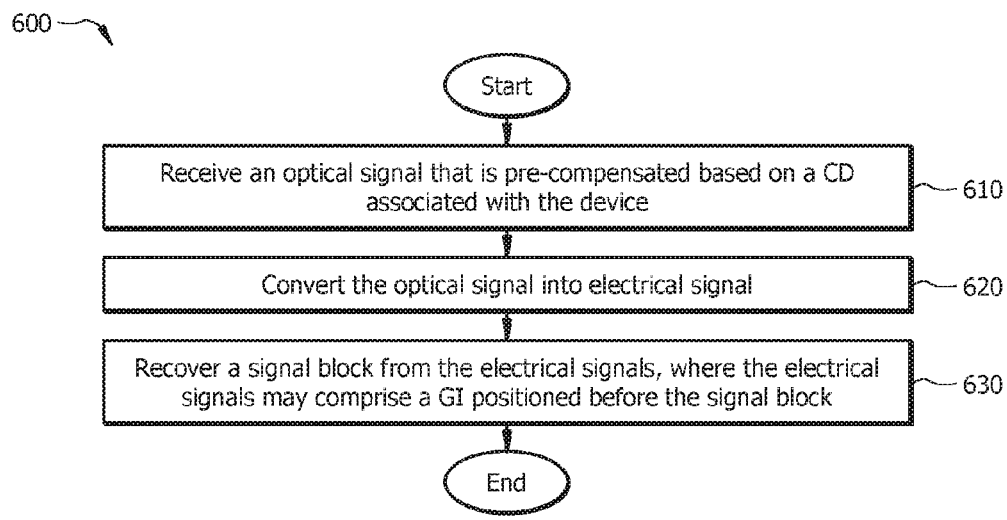
FIG. 6 is a flowchart of an embodiment of a method for processing a fiber dispersion pre-compensated optical signal.

FIG. 6 is a flowchart of an embodiment of a method 600 for processing a fiber dispersion pre-compensated optical signal. The method 600 may be implemented at an optical receiver of an optical communication device, such as the transceiver unit 300, and may be employed by an OLT, such as the OLT 110, or an ONU, such as the ONU 120. At step 610, method 600 may receive an optical signal that is pre-compensated based on a CD associated with the device. For example, a transmitter, similar to the transmitter 200, may perform pre-EDC prior to transmitting the optical signal. At step 620, method 600 may convert the optical signal into electrical signals, for example, via an O/E frontend, such as the O/E frontend 320. At step 630, method 600 may recover a signal block from the electrical signals, where the electrical signals may comprise a GI positioned before the signal block. The GI may not carry data and may enable mitigation of pulse broadening effect caused by residual fiber dispersion (e.g., after pre-compensation). The GI may be configured by employing substantially similar mechanisms as described in Equation (1) or (2). It should be noted that method 600 may be suitable for any receiver architecture, such as the DD receiver architecture or the coherent receiver architecture.

FIGS. 7-10 illustrate and compare the effects of pre-EDC at an optical transmitter and the performance improvement provided by the pre-EDC at an optical receiver. The optical transmitter may be similar to the optical transmitter 200 or the transceiver unit 300 and may be located at an OLT, such as the OLT 110, or at an ONU, such as the ONU 120. The optical receiver may be similar to the transceiver unit 300 and may be located at the OLT or the ONU. FIGS. 7A-8B illustrate plots captured for a 40 Gbps 4-PAM signal over a first optical transmission link comprising a standard single-mode fiber (SSMF) fiber with a dispersion coefficient of about 17 picoseconds per nanometer wavelength change and kilometer propagation distance (ps/nm/km) and a length of about 40 km. Thus, the total amount of CD in the first optical transmission link may be about 680 picoseconds per nanometer (ps/nm). FIGS. 9A-10C illustrate plots captured for a 40 Gbps positive-valued OFDM signal or DMT signal with 16-QAM subcarrier modulation over a second optical transmission link comprising an SSMF fiber with a dispersion coefficient of about 17 ps/mn/km and a length of about 32 km, thus the total amount of CD in the second optical transmission link may be about 544 ps/nm.

Figures 7A, 7B:
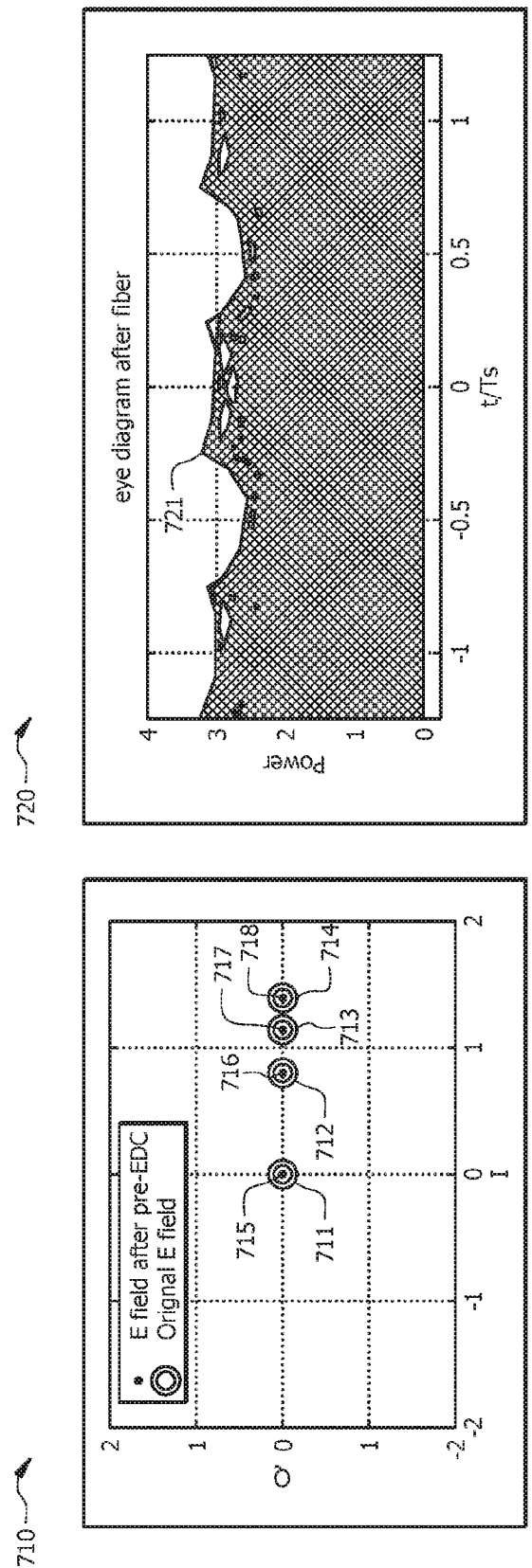
FIG. 7A illustrates an embodiment of a transmitter signal constellation plot for a 40 gigabits per second (Gbps) 4 levels-pulse amplitude modulated (4-PAM) signal without pre-EDC.
FIG. 7B illustrates an embodiment of a receiver eye diagram for a 40 Gbps 4-PAM signal without pre-EDC.

FIG. 7A illustrates an embodiment of a transmitter signal constellation plot 710 for the 40 Gbps 4-PAM signal without pre-EDC. In the constellation plot 710, the x-axis represents I components of an E-field and the y-axis represents Q components of the E-field, where the x-axis and the y-axis may be in some constant units. The points 711, 712, 713, and 714 (shown as circles) may represent the E-field of the 4-PAM signal at the transmitter and may correspond to the 4 signal levels provided by the 4-PAM modulation. For example, in gray-coding, the points 711, 712, 713, and 714 may represent binary values 00, 01, 11, and 10, respectively. The points 715, 716, 717, and 718 (shown as solid dots) may represent the E-field of the transmitted optical signal without pre-EDC, for example, by setting $D_{pre}$ to a value of zero during pre-EDC. As such, the points 711, 712, 713, and 714 may overlay with the points 715, 716, 717, and 718, respectively.

FIG. 7B illustrates an embodiment of a receiver eye diagram 720 for the 40 Gbps 4-PAM signal without pre-EDC. In the eye diagram 720, the x-axis represents time in units of time per symbol period (t/Ts) and the y-axis represents normalized received power in some constant units. The eye pattern 721 may be captured at the receiver after the 4-PAM signal propagates through the first optical transmission link, for example, via an oscilloscope with overlaying or superimposing sweeps of many different blocks of a digital data signal received at the receiver. Differences in timing and amplitude from bit-to-bit cause the eye pattern 721 to open or shrink. As observed in the eye diagram 720, the eye pattern 721 is about completely closed due to fiber dispersion, where the 4 signal levels of the 4-PAM may not be distinguishable. As such, the receiver may not be able to recover the original data carried in the 4-PAM signal without CD equalization.

Figures 8A, 8B:
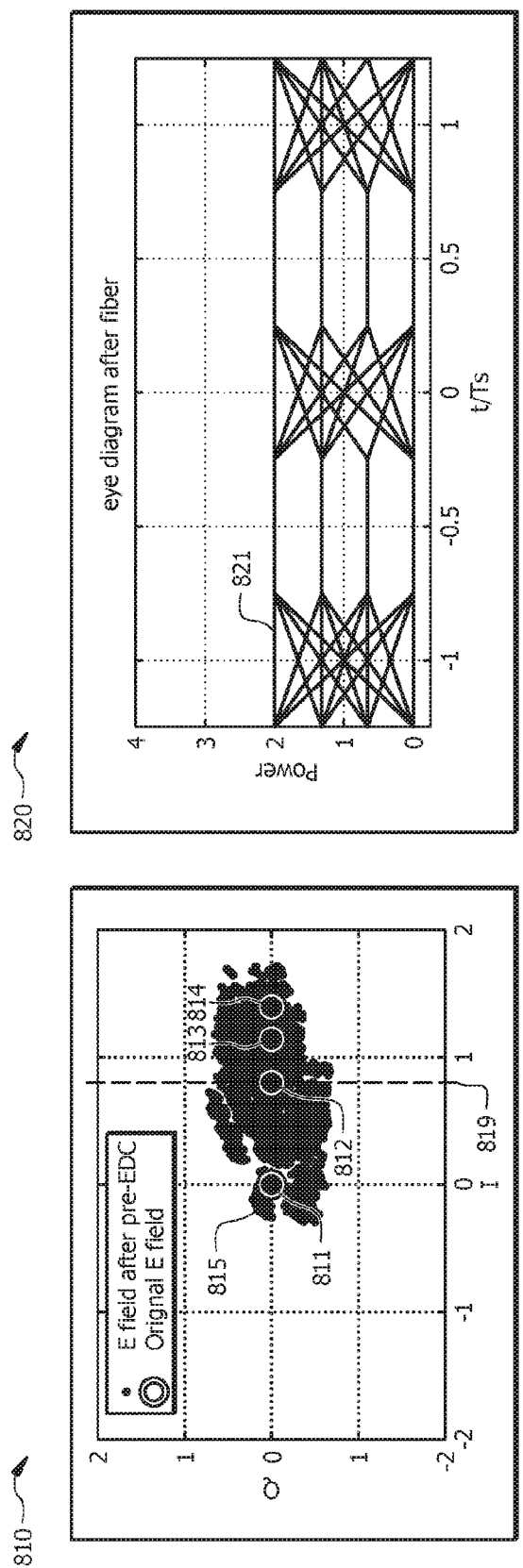
FIG. 8A illustrates an embodiment of a transmitter signal constellation plot for a 40 Gbps 4-PAM signal with pre-EDC.
FIG. 8B illustrates an embodiment of a receiver eye diagram for a 40 Gbps 4-PAM signal with pre-EDC.

FIG. 8A illustrates an embodiment of a transmitter signal constellation plot 810 for the 40 Gbps 4-PAM signal with pre-EDC. In the constellation plot 810, the x-axis represents an I component of an E-field and the y-axis represents the Q component of the E-field, where the x-axis and the y-axis may be in some constant units. The points 811, 812, 813, and 814 (shown as circles) may represent the E-field of the 4-PAM signal at the transmitter and may correspond to the 4 signal levels provided by the 4-PAM modulation. The points 815 (shown as solid dots) may correspond to the points 811, 812, 813, and 814 after pre-EDC, for example, by setting $D_{pre}$ to a value opposite in sign to the dispersion value of the first optical transmission link (e.g., $D_{pre}$=−680 ps/nm). As can be seen, the points 815 may be rotated and/or scaled after the pre-EDC. In addition, the points 815 may comprise a DC component or DC offset at about 0.8 or about 0.9 (shown as 819). It should be noted that by separating or removing the DC component as described above in method 300, the points 815 may be converted by DACs, such as the DACs 220, with lower resolution than without the DC removal.

FIG. 8B illustrates an embodiment of a receiver eye diagram 820 for the 40 Gbps 4-PAM signal with pre-EDC. In the eye diagram 820, the x-axis represents time in units of t/Ts and the y-axis represents normalized received power in some constant units. The eye pattern 821 may be captured at the receiver after the 4-PAM signal propagates through the optical transmission link by employing substantially similar mechanism as described above with respect to FIG. 5. As observed in the eye diagram 820, the eye pattern 821 is opened and the 4 signal levels (e.g., at received power of about 0, about 0.7, about 1.4, and about 2) of the 4-PAM are clearly distinguishable. As such, the receiver may recover the original data carried in the 4-PAM signal without further CD equalization. By comparing the eye diagrams 720 and 820, the pre-EDC effectively removes the fiber dispersion penalty.

FIG. 9A illustrates an embodiment of a transmitter signal constellation plot 910 for the 40 Gbps positive-valued OFDM signal without pre-EDC, where the subcarriers of the OFDM signal may carry 16-QAM data symbols. In the constellation plot 910, the x-axis represents I components of an E-field and the y-axis represents Q components for E-field, where the x-axis and the y-axis may be in some constant units. The points 911 may represent the E-field of the OFDM signal at the transmitter without pre-EDC, for example, by setting $D_{pre}$ to a value of zero during pre-EDC. It should be noted that OFDM employs frequency subcarrier multiplexing, where data information bits are mapped to data symbols and carried in frequency subcarriers.

FIG. 9B illustrates an embodiment of a receiver spectrum plot 920 for the 40 Gbps positive-valued OFDM signal without pre-EDC, where the subcarriers of the OFDM signal may carry 16-QAM data symbols. In the receiver spectrum plot 920, the x-axis represents frequency in units of gigahertz (GHz) and the y-axis represents power in units of decibel (dB). The receiver spectrum 921 may represent the spectrum captured at the receiver after the OFDM signal propagates through the second optical transmission link. As can be seen, the receiver spectrum 921 shows the effect of fiber dispersion, which may broaden the OFDM signal channel bandwidth (e.g., in region 922) and distort the OFDM in-band frequency response (e.g., in region 923).

FIG. 9C illustrates an embodiment of a receiver subcarrier constellation plot 930 for the 40 Gbps positive-valued OFDM signal without pre-EDC, where the subcarriers of the OFDM signal may carry 16-QAM data symbols. In the subcarrier constellation plot 930, the x-axis represents I components and the y-axis represents Q components, where the x-axis and the y-axis may be in some constant units. The constellation plot 930 may be captured at the receiver after the OFDM signal propagates through the second optical transmission link. The constellation points 931 may correspond to the 16-QAM constellation points, each corresponding to data bits demodulated from each subcarrier. As can be seen, some of the constellation points 931 are spread out instead of tightly grouped to 16 distinct groups (e.g., with a substantial amount of distance between each group), and thus the receiver may not be able to perform slicing correctly or recover the original data carried in the OFDM signal without error. For example, the bit error rate (BER) for the received OFDM signal may be at about 3E-4.

FIG. 10A illustrates an embodiment of a transmitter signal constellation plot 1010 for the 40 Gbps positive-valued OFDM signal with pre-EDC, where the subcarriers of the OFDM signal may carry 16-QAM data symbols. In the constellation plot 1010, the x-axis represents an I component of an E-field and the y-axis represents the Q component of the E-field, where the x-axis and the y-axis may be in some constant units. The points 1011 may represent the E-field of the OFDM signal at a transmitter after pre-EDC, for example, by setting $D_{pre}$ to a value opposite in sign to the dispersion value of second optical transmission link (e.g., $D_{pre}$=−544 ps/nm). By comparing the constellation plots 910 and 1010, the points 1011 may be rotated and/or scaled after the pre-EDC. As can be seen, the points 1011 may comprise a DC component or DC offset at about 1.4 (shown as 1019). Similarly, by separating or removing the DC component as described above, the points 1011 may be converted by DACs, such as the DACs 220, with lower resolution than without the DC removal.

FIG. 10B illustrates an embodiment of a receiver spectrum plot 1020 for the 40 Gbps positive-valued OFDM signal with pre-EDC, where the subcarriers of the OFDM signal may carry 16-QAM data symbols. In the receiver spectrum plot 1020, the x-axis represents frequency in units of GHz and the y-axis represents power in units of dB. The receiver spectrum 1021 may represent the spectrum captured at the receiver after the OFDM signal propagates through the second optical transmission link. By comparing the receiver spectrum plot 1020 to the receiver spectrum plot 920, the receiver spectrum 1021 may be non-distorted and the OFDM signal may be carried within the OFDM channel bandwidth 1022 when the transmit signal is pre-compensated for the fiber dispersion.

FIG. 10C illustrates an embodiment of a receiver subcarrier constellation plot 1030 for the 40 Gbps positive-valued OFDM signal with pre-EDC, where the subcarriers of the OFDM signal may carry 16-QAM data symbols. In the receiver subcarrier constellation plot 1030, the x-axis represents I components and the y-axis represents Q components, where the x-axis and the y-axis may be in some constant units. The constellation plot 1030 may be captured at the receiver after the OFDM signal propagates through the second optical transmission link. The points 1031 may correspond to the 16-QAM constellation points received for each subcarrier. By comparing the constellation plot 1030 to the constellation plot 930, the constellation points 1031 may be tightly grouped to 16 distinct groups and separated by substantial amount of distances, thus the receiver may correctly recover the original data carried in the OFDM signal. For example, the receiver may receive the OFDM signal with a quality factor square (e.g., similar to a signal-to-noise (SNR) ratio) of about 18 dB.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a digital signal processing (DSP) unit configured to:
perform fiber dispersion pre-compensation on a digital signal sequence assigned to a remote optical receiver based on a dispersion value associated with the remote optical receiver to produce a pre-compensated signal; and
separate a direct current (DC) component from the pre-compensated signal to produce a DC-free pre-compensated signal component;
a plurality of digital-to-analog converters (DACs) coupled to the DSP unit and configured to convert the DC-free pre-compensated signal component into analog electrical signals; and
a frontend coupled to the DACs and configured to:
convert the analog electrical signals into a first optical signal;
add a constant optical electric (E)-field equal to the DC component to the first optical signal to produce a second optical signal; and
transmit the second optical signal to the remote optical receiver.

2. The apparatus of claim 1, wherein the dispersion value is opposite to an amount of chromatic dispersion (CD) associated with the remote optical receiver.

3. The apparatus of claim 2, wherein the first optical signal comprises a plurality of light pulses carrying the digital signal sequence, and wherein the DSP unit is further configured to:
insert a first guard interval (GI) before the digital signal sequence; and
insert a second GI after the digital signal sequence,
wherein the first GI and the second GI each comprise a duration greater than a DC-induced pulse broadening duration.

4. The apparatus of claim 3, wherein the first GI and the second GI comprise an integer number of symbol periods, and wherein the symbol periods are based on a transmission baud rate of the first optical signal.

5. The apparatus of claim 1, wherein the DSP unit is further configured to:
determine a frequency domain filter corresponding to the dispersion value; and
filter the digital signal sequence with the frequency domain filter in a frequency domain.

6. The apparatus of claim 1, wherein the DC-free pre-compensated signal component comprises a real component and an imaginary component, wherein a first DAC of the DACs is configured to convert the real component into a first analog electrical signal and a second DAC of the DACs is configured to convert the imaginary component into a second analog electrical signal.

7. The apparatus of claim 1, wherein the frontend comprises an optical in-phase/quadrature (I/Q) modulator comprising:
an in-phase (I) branch;
a quadrature (Q) branch;
a first Mach-Zehnder modulator (MZM) coupled to the I branch; and
a second MZM coupled to the Q branch,
wherein the first MZM and the second MZM are configured to perform optical I/Q modulation according to the analog electrical signals.

8. The apparatus of claim 7, wherein the frontend comprises a Mach-Zehnder interferometer (MZI) comprising:
a first interferometer arm coupled to the optical I/Q modulator;
a second interferometer arm configured to provide an about zero phase differential between the second interferometer arm and the I branch; and
an optical splitter coupled to the first interferometer arm and the second interferometer arm and comprising a pre-determined optical splitting ratio configured to provide the constant optical E-field.

9. The apparatus of claim 7, wherein the frontend further comprises an automatic bias controller configured to monitor and control a bias at the first MZM, the second MZM, or both the first MZM and the second MZM.

10. The apparatus of claim 1, wherein the apparatus is an optical line terminal (OLT) transmitter, and wherein the remote optical receiver is an optical network unit (ONU) receiver.

11. The apparatus of claim 1, wherein the DSP unit is further configured to determine the dispersion value based on a chromatic dispersion (CD) effect measured during initial set-up or installation of an optical network unit (ONU) comprising the remote optical receiver.

12. A method comprising:
performing fiber dispersion pre-compensation on a digital signal sequence assigned to a remote optical receiver based on a dispersion value associated with the remote optical receiver to produce a pre-compensated signal;
separating a direct current (DC) component from the pre-compensated signal to produce a DC-free pre-compensated signal component;
converting the DC-free pre-compensated signal component into analog electrical signals;
converting the analog electrical signals into a first optical signal;
adding a constant optical electric (E)-field equal to the DC component to the first optical signal to produce a second optical signal; and
transmitting the second optical signal to the remote optical receiver.

13. The method of claim 12, wherein the dispersion value is opposite to an amount of chromatic dispersion (CD) associated with the remote optical receiver.

14. The method of claim 13, wherein the first optical signal comprises a plurality of light pulses carrying the digital signal sequence, and wherein the method further comprises:
inserting a first guard interval (GI) before the digital signal sequence; and
inserting a second GI after the digital signal sequence,
wherein the first GI and the second GI each comprise a duration greater than a DC-induced pulse broadening duration.

15. The method of claim 14, wherein the first GI and the second GI comprise an integer number of symbol periods, and wherein the symbol periods are based on a transmission baud rate of the first optical signal.

16. The method of claim 12, performing the fiber dispersion pre-compensation comprises:

determining a frequency domain filter corresponding to the dispersion value; and filtering the digital signal sequence with the frequency domain filter in a frequency domain.

17. The method of claim 12, wherein the DC-free pre-compensated signal component comprises a real component and an imaginary component, and wherein the method further comprises converting the real component and the imaginary component into a first analog electrical signal and a second analog electrical signal, respectively.

18. The method of claim 12, wherein converting the analog electrical signals comprises performing optical in-phase/quadrature (I/Q) modulation according to the analog electrical signals.

19. The method of claim 18, wherein an optical line terminal (OLT) performs the method, and wherein the remote optical receiver is an optical network unit (ONU) receiver.

20. The method of claim 12, further comprising determining the dispersion value based on a chromatic dispersion (CD) effect measured during initial set-up or installation of an optical network unit (ONU) comprising the remote optical receiver.

* * * * *